United States Patent
Bentley

(10) Patent No.: US 6,973,178 B1
(45) Date of Patent: Dec. 6, 2005

(54) METHOD AND APPARATUS FOR IMPLEMENTING A BANDLIMITED RINGING SIGNAL FOR TELEPHONE NETWORKS

(75) Inventor: Ronald L. Bentley, Santa Rosa, CA (US)

(73) Assignee: Alcatel, Paris (FR)

(*) Notice: Subject to any disclaimer, the term of this patent is extended or adjusted under 35 U.S.C. 154(b) by 254 days.

(21) Appl. No.: 10/320,290

(22) Filed: Dec. 16, 2002

(51) Int. Cl.[7] ............................................. H04M 19/02
(52) U.S. Cl. ............. 379/373.03; 379/413; 379/413.01
(58) Field of Search ............................. 379/418, 413, 379/251–255, 372–375, 413.01; 327/106, 327/114, 120, 130, 100

(56) References Cited

U.S. PATENT DOCUMENTS 4,192,007 A * 3/1980 Becker .................... 708/276
5,325,060 A * 6/1994 Mansfield et al. ........ 324/322

* cited by examiner

Primary Examiner—Sinh Tran
Assistant Examiner—Walter F Briney, III
(74) Attorney, Agent, or Firm—Danamraj & Youst, P.C.; Bobby D. Slaton; V. Lawrence Sewell

(57) ABSTRACT

Method and apparatus for generating a bandlimited square waveform for use as a ringing voltage in a telephone network is described. One embodiment comprises a method of generating a ringing voltage signal for transmission to a telephone device. The method comprises calculating a truncated Fourier series representation of a square wave using only low order harmonic frequencies thereof; determining a sampling rate; generating digital sample data using the truncated Fourier series representation and the sampling rate; and converting the digital sample data to an analog signal.

21 Claims, 3 Drawing Sheets

METHOD AND APPARATUS FOR IMPLEMENTING A BANDLIMITED RINGING SIGNAL FOR TELEPHONE NETWORKS

BACKGROUND OF THE INVENTION

1. Technical Field of the Invention

The present invention generally relates to telephone networks. More particularly, and not by way of any limitation, the present invention is directed to method and apparatus for implementing a bandlimited ringing signal for implementation in telephone networks.

2. Description of Related Art

The telephone network infrastructure currently in place represents an enormous capital investment that has taken place over more than a century and was primarily designed for voice services. Over time, however, numerous upgrades have been made to existing telephone networks to take advantage of advancements in transmission and switching technologies. For example, high-capacity, fiber optic transmission facilities currently exist in nearly every telephone company backbone network worldwide. The use of fiber optics has improved the quality and variety of services available, increased the capacity of traffic that can be supported by the backbone network, and reduced overall operating expenses.

As a result, high-capacity service capabilities exist between telephone company Central Offices ("COs"). This has not been the case with the local loop access network, a.k.a., the "last mile", which interconnects the subscriber premises equipment (e.g., telephone) to a Subscriber Line Interface Card ("SLIC") at the telephone company CO or Remote Terminal ("RT"). For purposes of example herein, it will be presumed throughout this document, unless otherwise noted, that the subscriber premises equipment are connected directly to an SLIC at the CO. In particular, in a Plain Old Telephone System ("POTS"), twisted-pair copper wire local loops interconnect the subscriber premises equipment to the CO or RT. COs, in turn, are interconnected through an inter-CO network consisting of Digital Access and Crossconnect Systems ("DACS") and T/E-carrier transmission equipment. As previously indicated, inter-CO networks have been upgraded to the take advantage of the latest in fiber optic technology.

In summary, in traditional POTS, the connection between the subscriber premises and the CO is analog, while the inter-CO backbone network is digital. As a result, until fairly recently, the two have been, in many respects, incompatible.

Digital Subscriber Line ("DSL") technology was deployed by Local Exchange Carriers ("LECs") as a solution to the "last mile" problem. DSL uses existing POTS infrastructure, which consists of twisted-pair copper telephone lines. DSL was developed in an effort to compete with cable companies, which were providing such high-speed data transmission services via their coaxial cable networks. Currently, DSL provides high-speed networking capabilities over ordinary twisted-pair copper wire telephone lines, which are capable of handling frequencies of up to several million Hertz for high-speed transmission of high-bandwidth data to users. Other advantages of DSL include that it utilizes digital modem technology, it integrates voice and data functionality, it features an "always ON" characteristic, and it supports high data transmission rates. Currently, POTS voice transmission utilizes frequencies below 3.4 KHz; DSL digital services utilize higher bandwidth through FDM techniques.

DSL is a distance-sensitive technology, in that the grade of service provided depends on the distance of the subscriber from the Central Office ("CO"). For example, the limit for Asynchronous DSL ("ADSL") service is approximately 18,000 feet. This distance-sensitivity is due primarily to attenuation and cross-talk between adjacent wires.

As previously indicated, DSL transmission takes place between the subscriber premises equipment and the CO (or RT) over the twisted wire pair comprising the local loop. Simultaneously utilizing the local loop is the POTS circuitry, such as the ringer unit of a telephone device. The telephone ringer unit responds to a ringing voltage, or ringing signal, from the CO to generate a ringing sound at the telephone device. In the United States, the ringing voltage is implemented as a 90 to 120 VAC, 20 Hz periodic signal. In practice, a trapezoidal, rather than a sinusoidal, waveform may be used to implement the ringing voltage. This is due to the fact that a trapezoidal waveform delivers more gives higher RMS power for the same peak voltage and, due to power dissipation over long lines, it may not be possible to generate a sine wave having the necessary peak voltage to deliver an acceptable RMS power level.

FIG. 1 is a timing diagram of a trapezoidal waveform 100 comprising a conventional prior art ringing signal. It will be recognized by those skilled in the art that presently in the United States, the cadence of the ringing voltage is two seconds on, four seconds off.

The energy of the ringing signal can be affected by local loop characteristics, cable interface between CO and customer premises, and subscriber premises equipment, which is frequently highly non-linear in nature. Due to the non-linear load, harmonic distortions can be produced that would introduce high frequency components into the ringing signal. In general, the less "spectrally compact" the ringing signal (i.e., the greater the number of harmonics used to produce the signal waveform), the richer the spectrum of harmonic distortions produced at the output.

Additionally, as previously noted, the ringing signal may be implemented using a trapezoidal waveform. It will be recognized that any periodic signal can be expressed as a Fourier series comprising a DC term plus sine and cosine waves of a fundamental frequency plus sine and cosine waves of even and odd harmonic frequencies. By inspection, it can be determined that the Fourier series spectrum of a trapezoidal waveform goes to infinity. As a result, even without perturbation, high frequency components exist within the typical ringing signal.

It will be recognized that any energy introduced by the POTS circuitry on the line between 28 KHz and 138 KHz can serve to perturb and even, in extreme cases, disable DSL transmissions on the upstream. Accordingly, in a worst case scenario, the high frequencies produced as a result of the ringing signal can desynchronize an ADSL modem on the local loop, resulting in the need to resynchronize the modem before further DSL communications via the local loop can occur.

SUMMARY OF THE INVENTION

Accordingly, the present invention advantageously provides method and apparatus for implementing a bandlimited ringing voltage signal in a telephone network.

One embodiment is a method of generating a ringing voltage signal for transmission to a telephone device. The method comprises calculating a truncated Fourier series representation of a square wave using only low order harmonic frequencies thereof; determining a sampling rate;

generating digital sample data using the truncated Fourier series representation and the sampling rate; and converting the digital sample data to an analog signal.

Another embodiment is an apparatus for generating a ringing voltage signal for transmission to a telephone device. The apparatus comprises means for calculating a truncated Fourier series representation of a square wave using only low order harmonic frequencies thereof; means for determining a sampling rate; means for generating digital sample data using the truncated Fourier series representation and the sampling rate; and means for converting the digital sample data to an analog signal.

Yet another embodiment is a subscriber line interface circuit ("SLIC"). The SLIC comprises a processor for calculating a truncated Fourier series representation of a square wave using only low order harmonic frequencies thereof and generating digital sample data using the truncated Fourier series representation and a specified sampling rate; and a digital-to-analog converter for converting the digital sample data to an analog signal.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
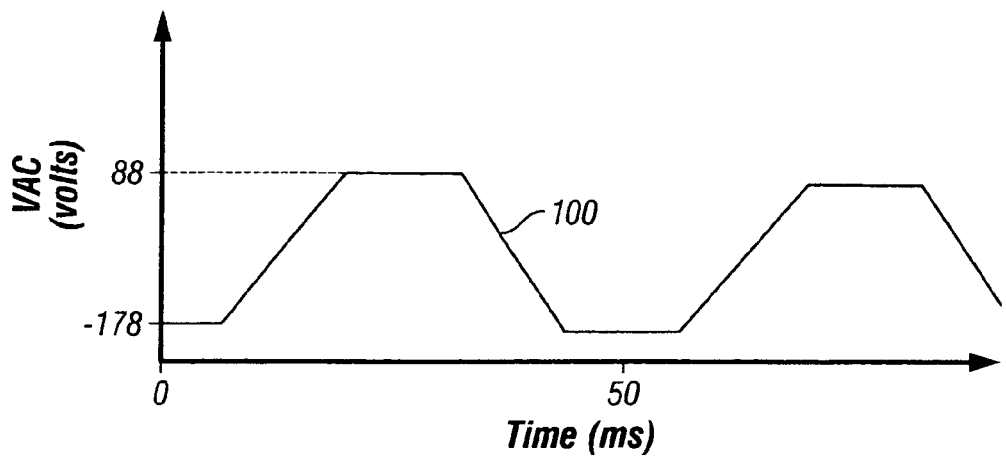
FIG. 1 is a timing diagram of an exemplary prior art ringing voltage signal generated by a CO in a local loop of a telephone network.

In the drawings, like or similar elements are designated with identical reference numerals throughout the several views thereof, and the various elements depicted are not necessarily drawn to scale.

Figure 2:
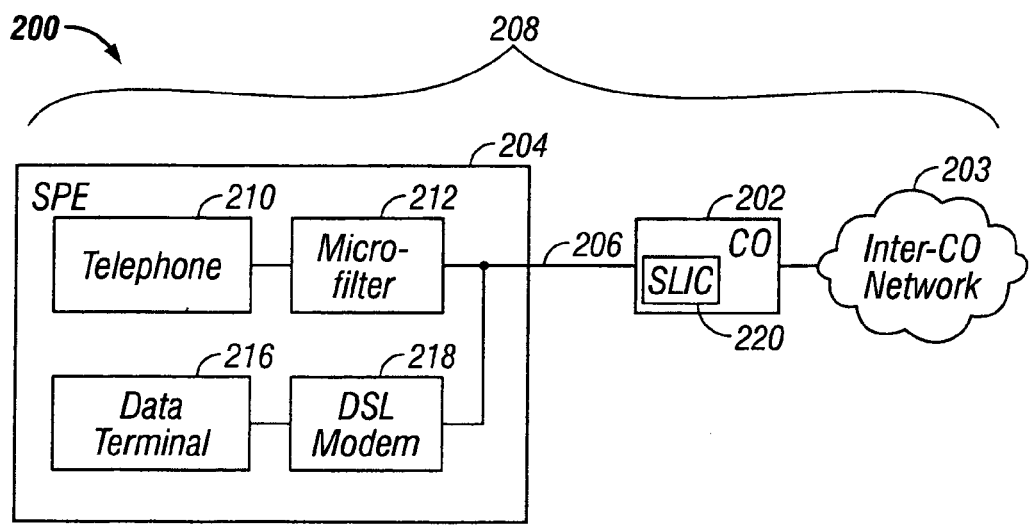
FIG. 2 is a block diagram of a local loop of a telephone network for implementing one embodiment.

FIG. 2 is a block diagram of a portion of a telecommunications network 200 in accordance with one embodiment. The network 200 includes a telephone company central office ("CO") 202 connected to other COs (not shown) similar to the CO 202 via an inter-CO network 203. Subscriber premises equipment ("SPE") 204 is connected to the CO 202 via a twisted pair telephone line 206. It will be recognized that, although only one SPE unit 204 is represented in FIG. 2, several similar SPE units will be connected to the CO 202. Moreover, the SPE 204 may be connected to the CO 202 via a remote unit (not shown). The SPE 204, line 206, and CO 202 comprise a local loop 208. Again, although not illustrated in FIG. 2, it will be recognized that multiple local loops comprising the CO 202 may be included in the network 200.

In one embodiment, the SPE 204 includes such equipment as a conventional telephone 210, which is connected to the line 206 via a microfilter 212, which comprises a low pass filter for permitting only low-frequency (i.e., conventional voice) signals to pass to the telephone. Additionally, the SPE 204 includes a data terminal, such as a personal computer ("PC") 216, connected to the line 206 via a DSL modem 218. It will be recognized that in some instances, a POTS splitter, rather than the microfilter 212, will be provided as part of the SPE to enable the local loop 208 to be used simultaneously for DSL and telephone services.

As previously indicated, the line 206 comprises a twisted pair of copper wires conventionally referred to as "Tip" and "Ring" lines. As also previously noted, to ring a telephone, such as the telephone 210, a subscriber line interface card ("SLIC") 220 of the CO 202 sends a ringing voltage signal to the telephone via the Ring line. The SLIC 220 functions as the interface between the local loop 208 and the CO switch (not shown). SLIC functions generally include −48 volt DC battery for powering the telephone 210, generation of ringing voltage, overload protection, and loop supervision. As has been previously noted, it is common knowledge that any periodic signal can be expressed as a Fourier series comprising a DC term plus sine and cosine waves of a fundamental frequency plus sine and cosine waves of even and odd harmonic frequencies. The Fourier series of a conventional square wave includes only odd harmonics. By inspection, it can be determined that the Fourier series spectrum of a conventional, non-bandlimited square waveform goes to infinity. As a result, even without perturbation, high frequency components exist within such a waveform.

The concept of "crest factor" is one that will be recognized by those of ordinary skill in the art. In general, any repeating waveform has a crest factor, which is defined as the ratio of the peak value of the waveform to the RMS value of the waveform. For example, one cycle of a pure sine wave with a peak value of 1.00 will have an RMS value of 0.707, and a crest factor of 1.414. In contrast, one cycle of a pure square wave with a peak value of 1.0 will have an RMS value of 1.0 and a crest factor of 1.0. The crest factor of a waveform relates to power consumption and dissipation. In particular, a lower crest factor signal results in lower power consumption and dissipation. Moreover, in instances, such as the situation described herein, where the peak voltage of a waveform is limited, one way of increasing the RMS power delivered by a waveform is to vary its crest factor. A change in the shape of a waveform will result in a corresponding change in its crest factor.

As previously indicated, although the crest factor of a pure square wave is as good as it gets, the harmonic spectrum of a pure square wave contains too many high frequency components to be useful as a ringing voltage. In contrast, using just the fundamental frequency of a square wave eliminates the high frequency components of the square wave, but results in an increased crest factor.

Figure 3:
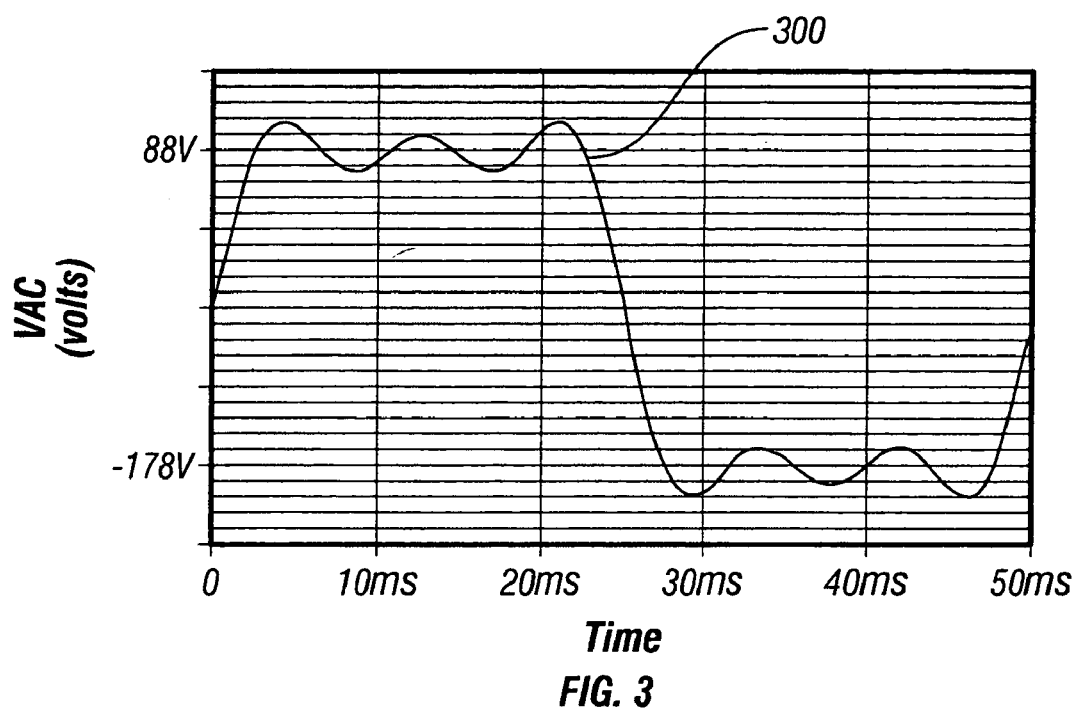
FIG. 3 is a timing diagram of a bandlimited square wave ringing voltage generated in accordance with one embodiment.

In accordance with one embodiment, a 20 Hz, bandlimited, square waveform, as illustrated in FIG. 3 and designated by a reference numeral 300, instead of a conventional 20 Hz trapezoidal waveform, as illustrated in FIG. 1, is used as the ringing voltage signal to the telephone 210. In accordance with one embodiment, the waveform 300 is constructed of only a DC offset plus the fundamental and third and fifth harmonic frequencies. By utilizing only the first two low-order harmonic frequencies, the bandwidth of the ringing signal, and therefore the potential for disruption of DSL components on the line 206, is limited. Additionally, application of at least some of the harmonic frequencies reduces the crest factor of the waveform 300 below that of a pure sine wave (1.414).

Calculation of the Fourier series coefficients and crest factor of the waveform 300 is set forth in detail below. It will be assumed that the number of harmonics q is equal to two and that the number of sampling points m in the base period is equal to 10000.

The Fourier series coefficients $b_n$ can be calculated as follows:

$$b_n = \frac{4}{(n \cdot 2 + 1) \cdot \pi}, n = 0, \ldots q$$

Accordingly, the Fourier series coefficients for the proposed bandlimited ringing signal 300 are:
$b_0$=1.273
$b_1$=0.424
$b_2$=0.255

The Fourier series representation of the waveform 300 is:

$f(x)$=1.273 sin($x$)+0.424 sin($3x$)+0.255 sin($5x$)

The composite voltage $v_k$ of an embodiment of a bandlimited ringing voltage is:

$$v_k = \sum_n b_n \sin\left[\frac{(n \cdot 2 + 1) \cdot 2 \cdot \pi \cdot k}{m}\right], k = 0, \ldots m$$

The peak value d and RMS value r of the waveform 300 are respectively:

$d$=max ($v$)=1.188

$$r = \left[\frac{\sum_k (v_k)^2}{m}\right]^{1/2} = 0.966$$

Therefore, the crest factor cr of the waveform 300 is:

$cr=d/r=1.23$

As previously noted, a change in the shape of a waveform will effect a change in crest factor. Accordingly, in one embodiment, the Fourier series coefficients calculated above may be "tweaked", or varied somewhat, to change the shape of the wave to achieve a particular crest factor. The end result of such tweaking is that it can enable the production of a waveform that delivers a desired RMS power level despite limitations on peak voltage level.

Figure 4:
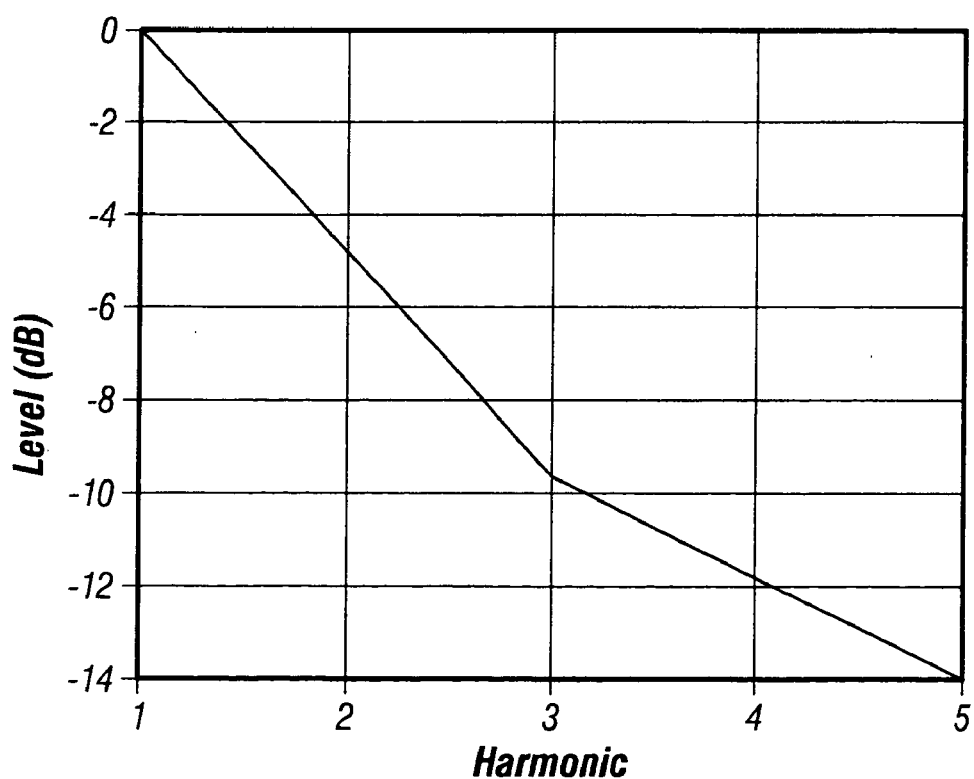
FIG. 4 is a graph illustrating the level of various harmonic frequencies of a square wave relative to the level of the fundamental frequency thereof.

FIG. 4 illustrates the respective levels of the first five harmonic frequencies of a square wave relative to the fundamental frequency thereof.

Figure 5:
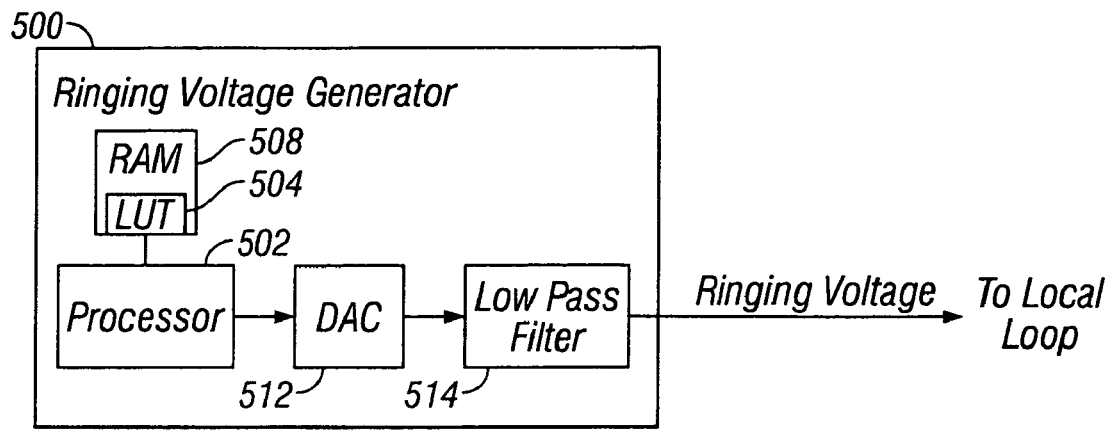
FIG. 5 is a block diagram of a device for generating a bandlimited square wave ringing voltage in accordance with one embodiment.

FIG. 5 is a block diagram of a device 500 for generating a bandlimited square wave ringing voltage to the telephone 210 in accordance with one embodiment. In at least one embodiment, the device 500 is embodied within the SLIC 220.

Given the current state of technology, the bandlimited square wave ringing voltage 300 will be generated digitally, although it will be recognized that it could be generated using analog components as well. Assuming again that the period of the signal to be generated is 50 ms and that the fundamental, third, and fifth frequencies are to be used to generate the signal, the Nyquist condition requires that to avoid aliasing, the sampling rate must be at least 20*5*2 samples/second ("s/sec"), or 200 s/sec. This sampling rate is slow enough that a general purpose microprocessor 502 may be used to perform the calculations. Alternatively, a Digital Signal Processor ("DSP") could be used instead of the microprocessor 502. As another alternative, the required values could be precalculated and stored in a look-up table ("LUT") 504 within a RAM 508.

As previously indicated, the minimum sampling rate is 200 s/sec; however, in practice, a sampling rate of N*20*5*2 would be used, where N is some oversampling factor. It should be noted that, although N need not be an integer or even a rational number, section of an integer renders the process easier. By oversampling, the alias products are moved spectrally further out, thereby facilitating analog low-pass filtering by a filter 511 after conversion of the samples to an analog signal by a digital-to-analog converter ("DAC") 512.

In one embodiment, N is selected such that the sampling rate is 1 Ms/sec. Assuming a sampling rate of 1 Ms/s, there would be spectral content at 20 Hz, 60 Hz, 100 Hz, 999900 Hz, 999940 Hz, 999980 Hz, 1000020 Hz, 1000040 Hz, 1000100 Hz, and then a set of sidebands at about N*1000000 Hz. The total spectrum would have a (sine x)/x shape imposed on it. Even if the DAC 512 is ideal, with infinite bandwidth, and the (sine x)/x effect is ignored, the fact remains the undesired products would be 4 decades higher in frequency than the desired signal. A single pole filter would attenuate the alias spurs by 80 dB, a two pole 160 dB, and so on. Accordingly, a clean filter is trivial.

Figure 6:
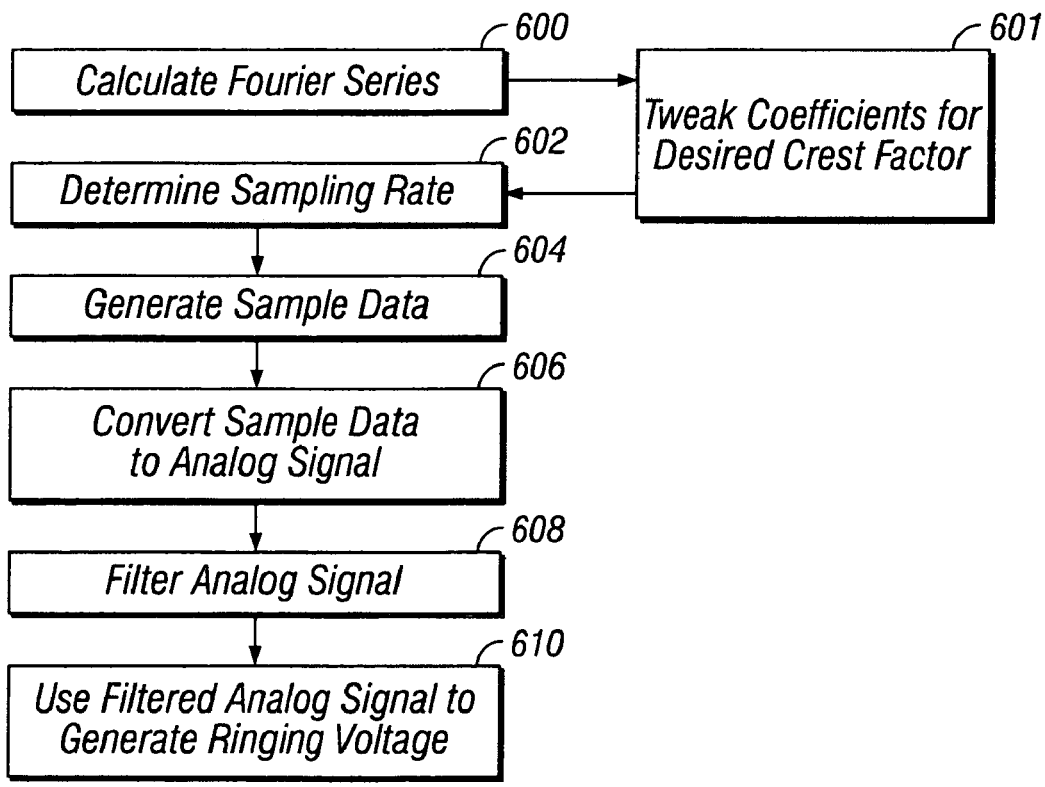
FIG. 6 is a flowchart of a method of generating a bandlimited square wave ringing voltage in accordance with one embodiment.

FIG. 6 is a flowchart of a method of generating a bandlimited square wave ringing voltage in accordance with one embodiment. In step 600, the Fourier series of a bandlimited square wave is calculated. In calculating the Fourier series in step 600, only low order (e.g., the first two or three) harmonic frequencies are considered. In step 601, the coefficient values calculated in step 600 may be tweaked to achieve a desired crest factor. In step 602, a sampling rate is determined. In step 604, the sample data is generated by a processor. Alternatively, the sample data is obtained from an LUT. In step 606, the sample data is converted to an analog signal by a DAC. In step 608, the analog signal is filtered using a low pass filter. In step 610, the filtered analog signal is used to produce a ringing voltage using the cadence two seconds (40 cycles) on, four seconds (80 cycles) off. It will be recognized that a windowing function (e.g., a Gaussian window) may be applied to the ringing voltage in such a manner as to soften the edges of the signal as it transitions between on and off states.

It will be recognized that the teachings and variations of the embodiments set forth herein can be applied to forms of DSL other than ADSL, including, but not limited to, Very High Bit Rate DSL ("VDSL"), Rate Adaptive DSL ("RADSL"), High Bit-Rate DSL ("HDSL"), Symmetric DSL ("SDSL"), and Multi Rate Symmetric DSL ("MSDSL").

Based upon the foregoing Detailed Description, it should be readily apparent that the present invention advantageously provides a bandlimited signal for implementing a ringing voltage for use in a telephone local loop.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method of generating a ringing voltage signal for transmission to a telephone device, the method comprising:
   calculating a truncated Fourier series representation of a square wave using only low order harmonic frequencies thereof;
   varying Fourier coefficients of the truncated Fourier series to achieve a desired crest factor;
   determining a sampling rate;
   generating digital sample data using the truncated Fourier series representation and the sampling rate; and
   converting the digital sample data to an analog signal.

2. The method of claim 1 further comprising filtering the analog signal using a low-pass filter.

3. The method of claim 2 further comprising producing a ringing voltage from the analog signal using a standard on/off cadence.

4. The method of claim 3 wherein the standard on/off cadence is two seconds on, four seconds off.

5. The method of claim 1 wherein the generating sample data comprises accessing a look-up table in which sample data is stored.

6. The method of claim 1 wherein the desired crest factor is dependent upon a required RMS power and a maximum peak voltage level of the ringing voltage signal.

7. The method of claim 1 wherein a frequency of the square wave is 20 Hertz.

8. Apparatus for generating a ringing voltage signal for transmission to a telephone device, the apparatus comprising:
   means for calculating a truncated Fourier series representation of a square wave using only low order harmonic frequencies thereof;
   means for varying Fourier coefficients of the truncated Fourier series to achieve a desired crest factor;
   means for determining a sampling rate;
   means for generating digital sample data using the truncated Fourier series representation and the sampling rate; and
   means for converting the digital sample data to an analog signal.

9. The apparatus of claim 8 further comprising means filtering the analog signal using a low-pass filter.

10. The apparatus of claim 9 further comprising means for producing a ringing voltage from the analog signal using a standard on/off cadence.

11. The apparatus of claim 10 wherein the standard on/off cadence is two seconds on, four seconds off.

12. The apparatus of claim 8 wherein the means for generating sample data comprises a processor for accessing a look-up table in which sample data is stored.

13. The apparatus of claim 8 wherein the means for generating sample data comprises a digital signal processor.

14. The apparatus of claim 8 wherein the desired crest factor is dependent upon a required RMS power and a maximum peak voltage level of the ringing voltage signal.

15. The apparatus of claim 8 wherein a frequency of the square wave is 20 Hertz.

16. A subscriber line interface circuit ("SLIC") comprising:
   a processor for calculating a truncated Fourier series representation of a square wave using only low order harmonic frequencies thereof and generating digital sample data using the truncated Fourier series representation and a specified sampling rate; and
   wherein the processor is enabled to vary Fourier coefficients of the truncated Fourier series to achieve a desired crest factor; and
   a digital-to-analog converter for converting the digital sample data to an analog signal.

17. The SLIC of claim 16 further comprising a low pass filter for filtering the analog signal.

18. The SLIC of claim 16 further comprising a look-up table ("LUT") connected to the processor for storing sample data.

19. The SLIC of claim 16 wherein the processor is a digital signal processor.

20. The SLIC of claim 16 wherein the desired crest factor is dependent upon a required RMS power and a maximum peak voltage level of the ringing voltage signal.

21. The SLIC of claim 16 wherein a frequency of the square wave is 20 Hertz.

* * * * *